March 16, 1926.
A. PERNO
UTENSIL
Original Filed Oct. 30, 1924
1,576,540
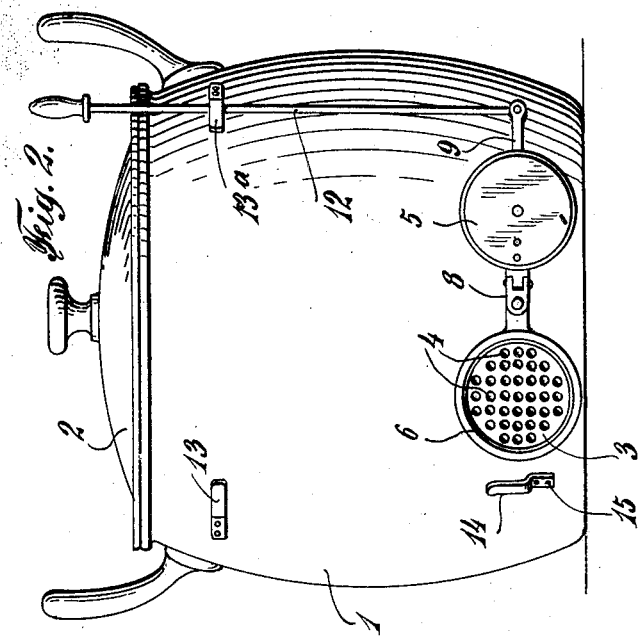
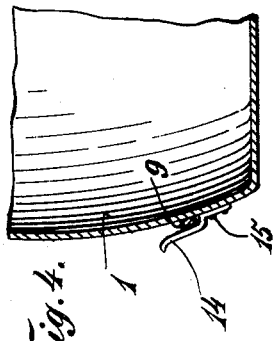
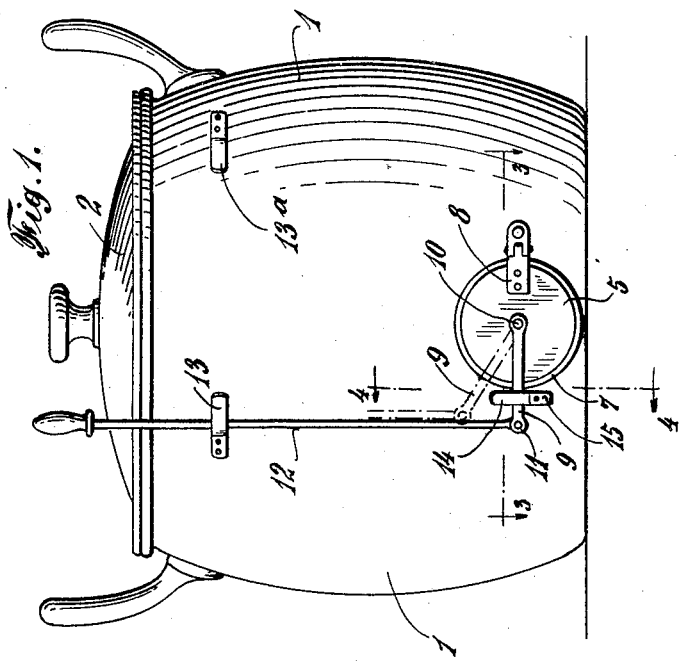
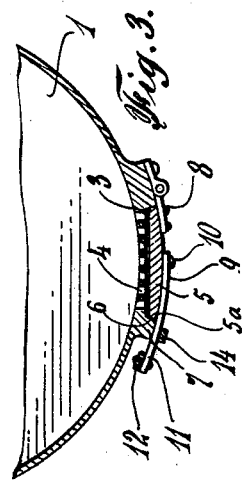
INVENTOR
*Arturo Perno*
BY
*T. F. Bourne*
ATTORNEY Patented Mar. 16, 1926.

1,576,540

UNITED STATES PATENT OFFICE.

ARTURO PERNO, OF NEW YORK, N. Y.

UTENSIL.

Application filed October 30, 1924, Serial No. 746,720. Renewed January 30, 1926.

*To all whom it may concern:*

Be it known that I, ARTURO PERNO, a subject of the King of Italy, and resident of New York city, in the county of New York and State of New York, have invented certain new and useful Improvements in Utensils, of which the following is a specification.

My invention relates to improvements in utensils and particularly to cooking utensils, although my improvements are adapted for use for boiling clothes and other articles, and for use in connection with chemicals, and in such relations where boiling or heated water or other fluid is to be drained from the utensil.

The object of my invention is to provide a utensil or pot with an outlet valve near the lower part thereof so arranged that the valve may be opened and closed by means exterior to the utensil or pot, and whereby the valve will be maintained close to the outer surface of the pot so as not to interfere with its use.

My invention also comprises novel details of improvement that will be more fully hereinafter set forth and then pointed out in the claims.

Reference is to be had to the accompanying drawings forming a part hereof, wherein—

Fig. 1 is a side view of a utensil or pot provided with my improvement, showing the valve closed;

Fig. 2 is a similar view, showing the valve open;

Fig. 3 is a horizontal section on line 3, 3, in Fig. 1; and

Fig. 4 is a vertical section on line 4, 4, in Fig. 1.

Similar numerals of reference indicate corresponding parts in the several views.

The numeral 1 indicates a utensil or pot, which may be of any suitable or usual construction and may have a cover 2 in an ordinary way. At the lower part of the utensil is an outlet opening 3, preferably foraminous, which may be in the nature of perforations 4 forming the outlet, or in the nature of a wire screen set at the outlet, as may be preferred. At 5 is a valve to close the said lower outlet, and at 6 is a seat for the valve. The valve is shown circular and provided with an inwardly tapering or cone-like peripheral surface at 5ª to engage the correspondingly cone-like seat 6. Said seat is shown formed upon the exterior surface of the utensil or pot by means of an annular protuberance 7 around the area of the outlet or drainage opening. The valve is hinged at one side to the utensil, as by means of a suitable hinge at 8, one member of which hinge is shown secured to the adjacent side of the valve, and the other member to the exterior of the utensil or pot, so that the valve may be swung away from seat 6 for drainage purposes and may be swung tight against such seat to close the drainage outlet. I provide means for operating the valve and retaining it closed tightly against the seat 6. In the example illustrated an arm 9 is pivoted at 10 in the center of the valve 5, as at its axis, to swing in the plane of the valve, and said arm is pivotally attached at 11 to an operating rod 12. The rod 12 is adapted to extend upwardly along the exterior of the utensil or pot 1, and the latter is provided with spaced keepers 13, 13ª, preferably near the upper part of the utensil, in such a manner that when valve 5 is closed the rod 12 will be retained in proper position by the retainer 13, and when the valve is open, the valve 12 will be retained by the retainer 13ª. At 14 is a keeper for the arm 9, which keeper is secured to the exterior of the utensil or pot adjacent to the valve seat 6. The keeper is shown in the form of an upwardly disposed finger, which may be riveted, as at 15, to the side of the utensil, and the inner surface of said keeper is inclined downwardly toward the utensil with the outer portion of the finger more widely disposed from the utensil so as to readily admit the arm 9 therebetween. The retainers 13 may be organized similarly to the retainer 14. The construction is such that the keeper 14 tends to force the arm 9 and valve 5 toward the utensil when said arm is pushed down between the keeper and the utensil.

When the valve 5 is to be closed the rod 12 is raised so the arm 9 will swing above the top of keeper 14, and when the valve is swung against seat 6 the rod 12 will be pushed down to cause the arm 9 to swing downwardly between keeper 14 and the wall of the utensil, so that said arm will be forced toward the utensil, whereby the valve 5 will be forced against seat 6 and be retained to form a tight fit therewith to prevent drainage of the liquid from the utensil. The upper portion of rod 12 will be fitted behind the retainer 13 to retain the parts in the closed position, as shown in Fig. 1. When the utensil or pot is to be drained the rod 12 may be released from the retainer 13 and raised, whereupon the arm 9 will be raised from the retainer 14, as indicated in dotted lines in Fig. 1, and then said rod and arm may be manipulated to swing the valve 5 open, whereupon the rod may be placed within the retainer 13ª, whereby the parts will be maintained, as indicated in Fig. 2, and the liquid may drain from the utensil.

By means of my improvement I provide a valve for a utensil or pot of the character specified which will project very slightly from the outer surface of the utensil, which valve need not be touched by the hand to open or close it, so that danger of injury from a heated valve is avoided, since the valve may be operated by means of the rod 12 which will not become overheated, as it extends upwardly out of the zone of the fire.

My improvement will be found advantageous for housewives in cooking food, boiling clothes, and other analogous uses, since the valve 5 readily may be opened to permit drainage of the liquid from the utensil, leaving the residue therein, without requiring the liquid to be emptied by tilting the utensil, as is customary with ordinary cooking pots. A further advantage is that the utensil or pot may be used where chemicals are to be heated or boiled, and for uses where it is desired to drain liquid from the utensil or pot to leave the remainder of the contents therein, whereby to avoid injury as is liable to occur where such draining of utensils of the character specified are tilted or turned upside down for draining liquid contents where it is necessary to retain the cover loosely thereon by hand, since steam that arises at such times frequently injures the operator.

Having now described my invention what I claim is:

1. A utensil of the character specified provided with a drainage outlet and a valve seat adjacent thereto, with a valve movably attached to the exterior of the utensil to close the said seat, and means to movably retain the valve closed, said means comprising an arm movably attached to said valve, a keeper for the arm attached to the utensil to retain the valve closed against the seat, a rod movably attached to said arm, and retaining means on the utensil for said rod.

2. A utensil as set for in claim 1, in which the retaining means comprise retainers on the exterior of the utensil adapted to retain the arm with the valve in the opened and closed positions respectively.

3. A utensil of the character specified provided with a drainage outlet and a valve seat adjacent thereto located on the exterior of the utensil, with a valve pivotally attached to the exterior of the utensil, to swing toward and outwardly from said seat, and means to movably retain the valve closed, said means comprising an arm movably attached to said valve, and a keeper for the arm attached to the utensil to retain the valve closed against the seat, said keeper having an outer portion spaced from the utensil and having its inner surface inclined toward the utensil to force the arm and the valve toward the utensil to retain the valve closed, a rod attached to said arm, and means on the utensil to retain the rod.

4. A utensil of the character specified provided with a drainage outlet and a valve seat adjacent thereto located on the exterior of the utensil, with a valve movably attached to the exterior of the utensil to swing toward and outwardly from said seat, and means to movably retain the valve closed, said means comprising an arm pivotally attached to the valve to swing in the plane of the latter, and a keeper upon the utensil spaced at its upper portion from the utensil to receive the arm therebetween, the inner portion of said keeper being inclined toward the utensil to force the arm and the valve toward the utensil to retain the valve against its seat with the arm between the retainer and the utensil, a rod pivotally attached to said arm, and retainers on the utensil to retain the rod with the valve in the opened and closed positions respectively.

ARTURO PERNO.